US007814410B2

(12) United States Patent
Kothari et al.

(10) Patent No.: US 7,814,410 B2
(45) Date of Patent: Oct. 12, 2010

(54) INITIAL SERVER-SIDE CONTENT RENDERING FOR CLIENT-SCRIPT WEB PAGES

(75) Inventors: Nikhil Kothari, Sammamish, WA (US); Bertrand Le Roy, Bellevue, WA (US)

(73) Assignee: Workman Nydegger, Redmond, WA (US)

( * ) Notice: Subject to any disclaimer, the term of this patent is extended or adjusted under 35 U.S.C. 154(b) by 1080 days.

(21) Appl. No.: 11/317,973

(22) Filed: Dec. 23, 2005

(65) Prior Publication Data

US 2007/0061700 A1 Mar. 15, 2007

Related U.S. Application Data

(60) Provisional application No. 60/716,299, filed on Sep. 12, 2005.

(51) Int. Cl.
G06F 17/22 (2006.01)
(52) U.S. Cl. .................................................... 715/234
(58) Field of Classification Search .................. 715/236
See application file for complete search history.

(56) References Cited

U.S. PATENT DOCUMENTS

| 5,761,683 | A * | 6/1998 | Logan et al. ................. 715/206 |
| 6,035,119 | A * | 3/2000 | Massena et al. ............. 717/100 |
| 6,189,030 | B1 * | 2/2001 | Kirsch et al. ................ 709/224 |
| 6,470,349 | B1 * | 10/2002 | Heninger et al. ............ 707/102 |
| 6,578,192 | B1 * | 6/2003 | Boehme et al. ............. 717/115 |
| 6,625,803 | B1 * | 9/2003 | Massena et al. ............. 717/100 |
| 6,704,024 | B2 * | 3/2004 | Robotham et al. .......... 345/581 |
| 7,054,952 | B1 * | 5/2006 | Schwerdtfeger et al. .... 709/246 |
| 7,519,902 | B1 * | 4/2009 | Kraft et al. .................. 715/234 |
| 2001/0047394 | A1 * | 11/2001 | Kloba et al. ................ 709/217 |
| 2002/0054090 | A1 * | 5/2002 | Silva et al. .................. 345/747 |
| 2002/0069255 | A1 * | 6/2002 | Dinovo ....................... 709/217 |
| 2002/0091840 | A1 * | 7/2002 | Pulier et al. ................. 709/228 |
| 2002/0103823 | A1 * | 8/2002 | Jackson et al. ........... 707/501.1 |
| 2002/0111967 | A1 * | 8/2002 | Nagase ....................... 707/513 |
| 2002/0138660 | A1 * | 9/2002 | Eilers et al. ................. 709/313 |
| 2003/0014478 | A1 * | 1/2003 | Noble ......................... 709/203 |
| 2003/0025728 | A1 | 2/2003 | Ebbo et al. |
| 2003/0037021 | A1 * | 2/2003 | Krothappalli et al. .......... 707/1 |

(Continued)

FOREIGN PATENT DOCUMENTS

WO WO 2004/055647 A2 7/2004

OTHER PUBLICATIONS

Bharadvaj et al., An Active Transcoding Proxy to Support Mobile Web Access, 1998, Proceedings of the 17th IEEE Symposium on Reliable Distributed Systems, pp. 118-123, ISBN: 0-8186-9218-9.*

(Continued)

*Primary Examiner*—Doug Hutton
*Assistant Examiner*—Frank D Mills (57) ABSTRACT

In a distributed computing system including at least one server and at least one client, the server simulates and executes a client-side script that generates the initial content of a Web page. Specifically, the server simulates a client-side execution environment to run the client-side script that generates the initial content of the Web page. As a result, the initial rendering of the Web page that a server sends over to the client already contains the initial content that is usually generated on the client.

10 Claims, 3 Drawing Sheets

U.S. PATENT DOCUMENTS

| | | | |
|---|---|---|---|
| 2003/0050931 A1* | 3/2003 | Harman et al. | 707/100 |
| 2003/0088639 A1* | 5/2003 | Lentini et al. | 709/217 |
| 2003/0131048 A1 | 7/2003 | Najork | |
| 2003/0135819 A1* | 7/2003 | Lakhdhir et al. | 715/500 |
| 2003/0200254 A1 | 10/2003 | Wei | |
| 2003/0236825 A1 | 12/2003 | Kulkarni | |
| 2004/0059809 A1* | 3/2004 | Benedikt et al. | 709/224 |
| 2004/0111488 A1* | 6/2004 | Allan | 709/217 |
| 2004/0133848 A1* | 7/2004 | Hunt et al. | 715/500 |
| 2004/0133855 A1* | 7/2004 | Blair et al. | 715/517 |
| 2004/0143787 A1* | 7/2004 | Grancharov et al. | 715/501.1 |
| 2004/0168122 A1 | 8/2004 | Murugaiyan | |
| 2004/0177327 A1 | 9/2004 | Kieffer | |
| 2004/0205650 A1* | 10/2004 | Cheng | 715/530 |
| 2004/0239681 A1 | 12/2004 | Robotham et al. | |
| 2005/0027823 A1 | 2/2005 | Rana | |
| 2005/0097008 A1 | 5/2005 | Ehring et al. | |
| 2005/0102611 A1* | 5/2005 | Chen | 715/513 |
| 2005/0149857 A1* | 7/2005 | Negishi et al. | 715/512 |
| 2005/0160358 A1 | 7/2005 | Gumz et al. | |
| 2006/0206589 A1* | 9/2006 | Lentini et al. | 709/219 |
| 2007/0136417 A1* | 6/2007 | Kreiner et al. | 709/203 |
| 2007/0256055 A1* | 11/2007 | Herscu | 717/115 |

OTHER PUBLICATIONS

Bickmore et al., Web Page Filtering and Re-Authoring for Mobile Users, 1999, The Computer Journal, vol. 42, No. 6, pp. 534-546.*

Liebeck, T., "New Web Framework: Echo2, With Ajax-Based Rendering," Mar. 24, 2005, <http://www.theserverside.com/news/thread.tss?thread-id=32834> [retrieved Oct. 5, 2005].

Murray, G., "Asynchronous JavaScript Technology and XML (AJAX) With Java 2 Platform, Enterprise Edition," Jun. 9, 2005, <http://java.sun.com/developer/technicalArticles/J2EE/AJAX> [retrieved Oct. 5, 2005].

Teare, D., "An Introduction to Ajax," Aug. 29, 2005, <http://dev2dev.bea.com/pub/a/2005/08/ajax_introduction.html> [retrieved Oct. 5, 2005].

PowerWEB LiveControls for ASP.NET, Dart Communications, Inc., http://www.dart.com/powerweb/livecontrols.asp, Oct. 5, 2005, 2 Pages.

Erik Bruchez, Are Server-Side XForms Engines the Future of XForms?, Orbeon Inc., http://idealliance.org/proceedings/xtech05/papers/03-08-03, Mar. 8, 2003, 13 Pages.

"Server-Side Javascript Guide" Internet Citation, [Online]XP002193750 Retrieved from the Internet: URL:http://developer.netscape.com/docs/manuals/ssjs/1_4/ssjs.pdf> [retrieved on Mar. 20, 2002].

* cited by examiner

INITIAL SERVER-SIDE CONTENT RENDERING FOR CLIENT-SCRIPT WEB PAGES

CROSS-REFERENCE TO RELATED APPLICATION

This application claims the benefit of U.S. Provisional Patent Application No. 60/716,299, filed on Sep. 12, 2005, titled "INITIAL SERVER-SIDE CONTENT RENDERING FOR CLIENT-SCRIPT WEB PAGES," the disclosure of which is hereby expressly incorporated by reference, and the filing date of which is hereby claimed under 35 U.S.C. §119 (e).

BACKGROUND

In a distributed computing system containing multiple entities such as a client component ("client") and a server component ("server"), typically the server provides the client the layout of a Web page, and the client runs a script to produce the initial content for the Web page. The content of the Web page can be dynamic: often, after the initial content of the Web page is rendered by the client-side script, the content of the Web page may be subsequently re-rendered by the client-side script in response to user actions and input from other entities in the distributed computing system.

Figure 1:
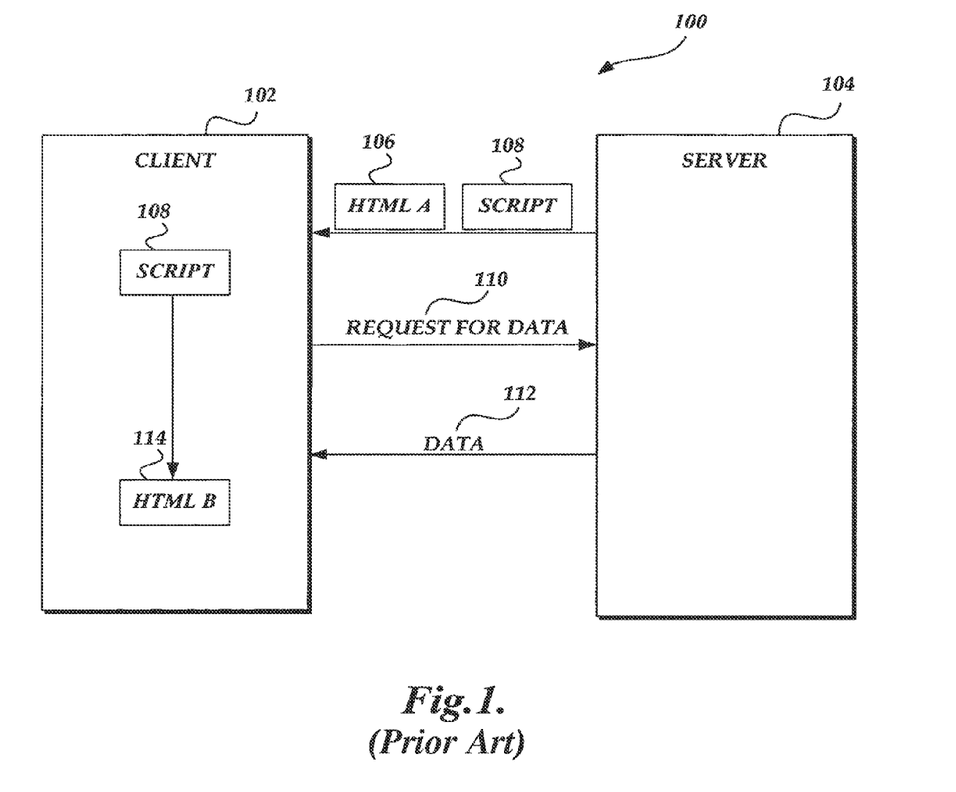
FIG. 1 is a block diagram illustrating an exemplary client-side rendering of initial content of a Web page.

FIG. 1 illustrates an exemplary distributed computing system 100 including at least one client 102 and at least one server 104. Upon receiving a request for displaying a Web page from the client 102, the server 104 may send the client 102 a hypertext markup language ("HTML") file such as HTML A (106) and a script 108. HTML A (106) contains layout information and static content of the Web page. The execution of the script 108 generates initial content of the requested Web page. Sometimes, the HTML A (106) and the script may be integrated in a same file.

As shown in FIG. 1, upon receiving the HTML A (106) and the script 108, the client 102 executes the script 108 to dynamically generate the initial content for the Web page. Often, the script 108 may need specific data from the server 104 to generate the initial content. The client 102 thus sends a request 110 for the needed data from the server 104, which then returns the requested data 112 to the client 102. Upon receiving the data 112, the script 108 executes and uses the data 112 to modify HTML A (106) to obtain HTML B (114). HTML B (114) includes both the layout and the initial content for the Web page. The content of the Web page may change later, for example, based on input provided by a user.

Such a client-side content rendering mechanism presents some problems. For example, search engines usually do not run scripts. Therefore, when a search engine queries the client 102 for the Web page, the search engine obtains what is offered by HTML A (106), i.e., the layout information and static content of the Web page. The search engine cannot obtain the actual content of the Web page that is important for indexing purposes. In addition, a Web browser on the client 102 may not have the ability to run scripts or the Web browser's ability to run scripts is disabled. As a result, the Web browser on the client 102 cannot run the script 108 to generate HTML B (114) and hence the initial content for the Web page.

While specific disadvantages of existing systems have been illustrated and described in this Background Section, those skilled in the art and others will recognize that the subject matter claimed herein is not limited to any specific implementation for solving any or all of the described disadvantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Aspects of the invention solve the above-identified problems by simulating and executing on the server a client-side script that renders initial content of a Web page. The simulation creates on the server a client-side execution environment for the script generating the initial content of the Web page. As a result, the initial rendering of the Web page sent to a client by a server already contains the initial content that is usually generated on the client.

One aspect of the invention includes a distributed computing system containing at least one server and at least one client. The server provides one or more Web pages for the client to display. The server uses a document object model (DOM) simulator to model a file containing the source code of a Web page. Such a file can be an HTML file, for example. The server may further include a script engine ("server-side script engine") that simulates or that is the same as the script engine used by the client.

The server uses the DOM simulator to provide a DOM of the layout and static content of a Web page and of scripts for the Web page. The server then extracts from the DOM the script that is responsible for rendering the initial content of the Web page. Such a script may be generated by sequentially ordering contents extracted from the DOM that exist in script tags and scripting source code in the DOM. The server then uses the server-side script engine to execute the extracted script on the DOM. As a result of executing the script, the DOM now contains the initial content of the Web page. The server then extracts the initial content of the Web page from the DOM. Finally, the server sends the initial content of the Web page to the client for display.

In summary, aspects of the invention enable a server in a distributed computing system to provide initial content of a Web page, wherein the initial content is usually rendered by a client-side script. Therefore, a client can display the initial content of the Web page even if the Web browser of the client cannot run the client-side script to generate the initial content. As a result, search engines that generally do not run scripts still can obtain the initial content of a Web page for indexing purpose.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The following text illustrates and describes exemplary embodiments of the invention. However, those of ordinary skill in the art will appreciate that various changes can be made therein without departing from the spirit and scope of the invention.

Embodiments of the invention may be described in the general context of computer-executable instructions, such as program modules, being executed by a computer including at least a processor and a memory. Generally described, program modules include routines, programs, widgets, objects, components, data structures, and the like that perform particular tasks or implement particular abstract data types. Embodiments of the invention may also be practiced in a distributed computing system including multiple entities. Each of the entities has the potential of functioning as a server providing a service as well as a client receiving the service provided by a server. The service can be, for example, providing a Web page. The entities may be local to a same computer system or are linked remotely through a communications network. In the distributed computing system, program modules may be located on local and/or remote computer storage media.

Exemplary embodiments of the invention utilize existing server-side technology to simulate on a server a client-side execution environment for a client-side script generating the initial content of a Web page. For example, a document object model ("DOM") simulator is needed to generate a DOM modeling a file containing the source code of a Web page. Such a file may be an HTML file, for example. The DOM simulates the object model of the HTML. The DOM can also be an extensible markup language ("XML") DOM, a technology that is available on almost any server platform. In addition, a server-side script engine is needed that simulates or functions the same as the client-side script engine. For example, if the client uses JavaScript as its script engine, the server needs to provide a script engine that is capable of executing JavaScript files. The server-side script engine may be a simulation of the client-side script engine or the client-side script engine itself. Once a DOM and a proper server-side script engine are available, the server-side script engine executes the client-side script such as the script 108 illustrated in FIG. 1 against the DOM to generate initial content for the Web page.

Figure 2:
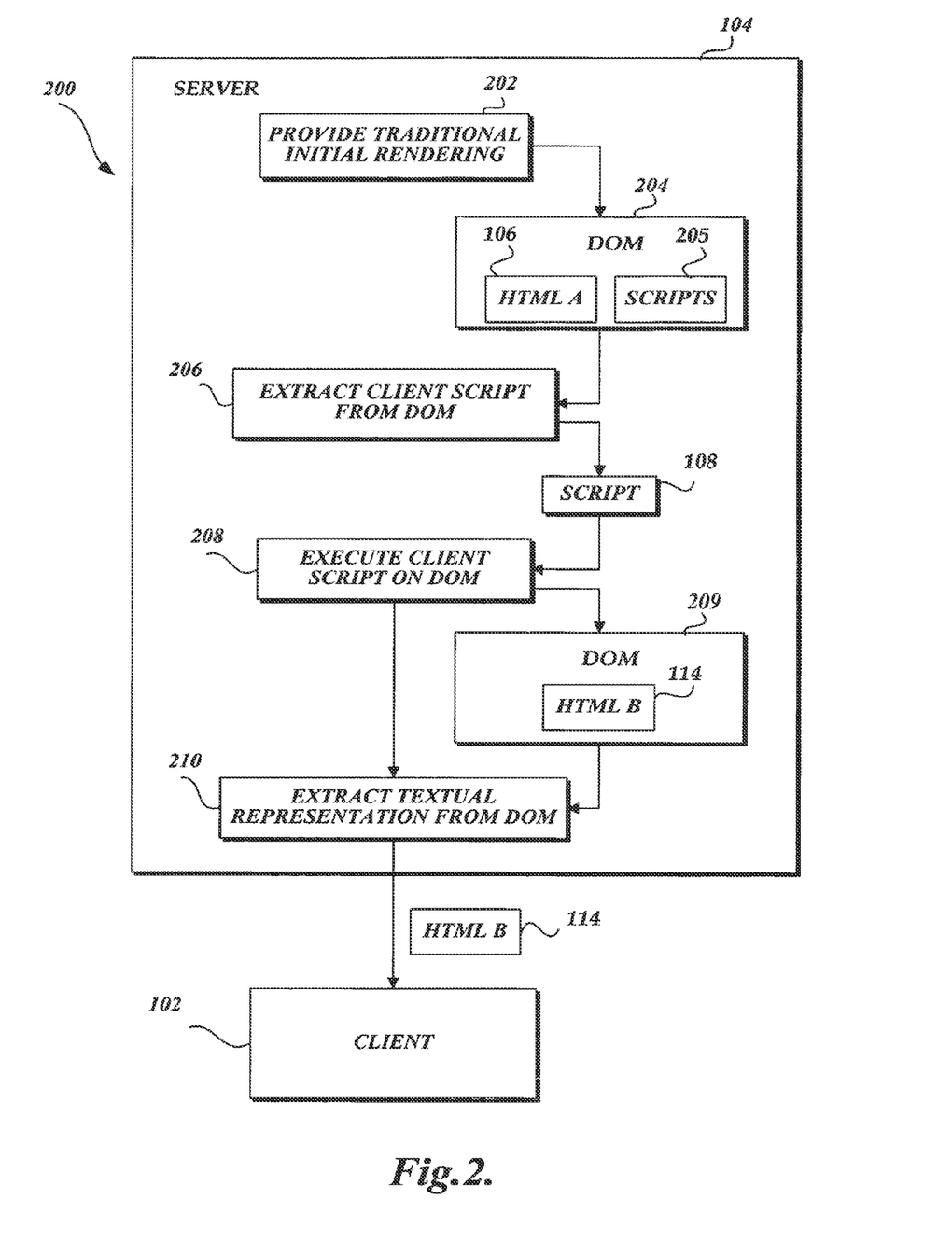
FIG. 2 is a block diagram illustrating an exemplary server-side rendering of initial content of a Web page.

FIG. 2 illustrates an exemplary implementation of a server-side process 200 for rendering an initial page such as the HTML B (114) for a Web page, wherein the initial page has all the initial content of the Web page. FIG. 2 is illustrated with reference to the distributed computing system 100 illustrated in FIG. 1. As shown in FIG. 2, the server 104 starts with a traditional initial rendering, i.e., providing HTML A (106) that contains layout information and static content of a Web page. See block 202. A DOM 204 simulating HTML A (106) then is generated. The DOM 204 may be generated by injecting HTML A (106) into a DOM parser, which can be a full HTML parser or an XML parser if HTML A (106) is compliant with extensible hypertext markup language ("XHTML") standard. As known by those of ordinary skill in the art, a parser, whether it is a DOM parser, an HTML parser, or an XML parser, is a computer program that analyzes the grammatical structure of an input with respect to a given set of formal grammar. Typically, a parser transforms the input into a data structure that catches the implied hierarchy of the input. The data structure can be, for example, a tree or even a graph. The data structure can be used for code generation, semantic checking, or simply to ease the further understanding of the input.

Besides simulating layout information and static content of a Web page, the DOM 204 also simulates scripts 205 for the Web page, including the script 108 for generating initial content of the Web page. The server 104 then extracts the script 108 from the DOM 204. See block 206. The script 108 is also called the client script because the script 108 was designed to run by the client 102. In exemplary embodiments of the invention, the server 104 constructs the script 108 by scanning the DOM 204 for <script> tags and by fetching or resolving <script src= . . . > scripts. The script 108 is built using the sequential order of the content in the <script> tags and the scripts designated in <script src= . . . >.

The server 104 then executes the script 108 on the DOM 204. See block 208. In an exemplary embodiment of the invention, the script 108 is executed in an enriched execution environment where the DOM 204 is available to the script 108 as built-in objects, accessible through the same paths as if the script 108 were on the client 102. As a result, the DOM 204 appears to the script 108 almost exactly as if the DOM 204 were a client-side DOM of HTML A (106).

As illustrated in FIG. 1, conventionally, the script 108 may send a request 110 for the data 112 to be rendered in the Web page. Because of security limitations on most Web browsers, the requested data 112 usually is stored on the server 104 that provides the initial rendering of the Web page. Therefore, the request 110 typically travels through a network that connects the client 102 and the server 106. Now, because the server 104 is simulating the client-side script execution environment, it would not be efficient or required to still let the data request 110 sent by the script 108 travels on the network that connects the client 102 and the server 104. Therefore, an exemplary embodiment of the invention provides a redirection mechanism that queries local data storage on the server 104 directly instead of sending the data request 110 through the network. The query may be performed in a manner that is transparent to the script 108. In some scenarios, a client 102 uses an XmlHttpRequest object for retrieving data for a Web page. Exemplary embodiments of the invention may implement a different XmlHttpRequest object that directs the request 110 for the data 112 on the server 104 to the right data object on the server 104 without making a network call. Alternatively, embodiments of the invention may stub out client-side functionalities in the script 108 that are no longer applicable on the server 104. For example, functionalities of a client-side timer in the script 108 may be muffled such that the timer does not raise any event when the script 108 is executed on the server 104.

The execution of the script 108 modifies the DOM 209. The DOM 209 now contains both the layout information and the initial content for the Web page; i.e., the DOM 209 now simulates the HTML B (114) illustrated in FIG. 1. The server 108 then extracts the text representation of the DOM 209 and sends it to the client 102. See block 210. The text representation forms the HTML B (114). Thus, the client 102 receives an initial rendering from the server 104—HTML B (104)— that contains the full initial content of the Web page. The content of the Web page may be updated later on the client-side in response to, for example, user input.

Figure 3:
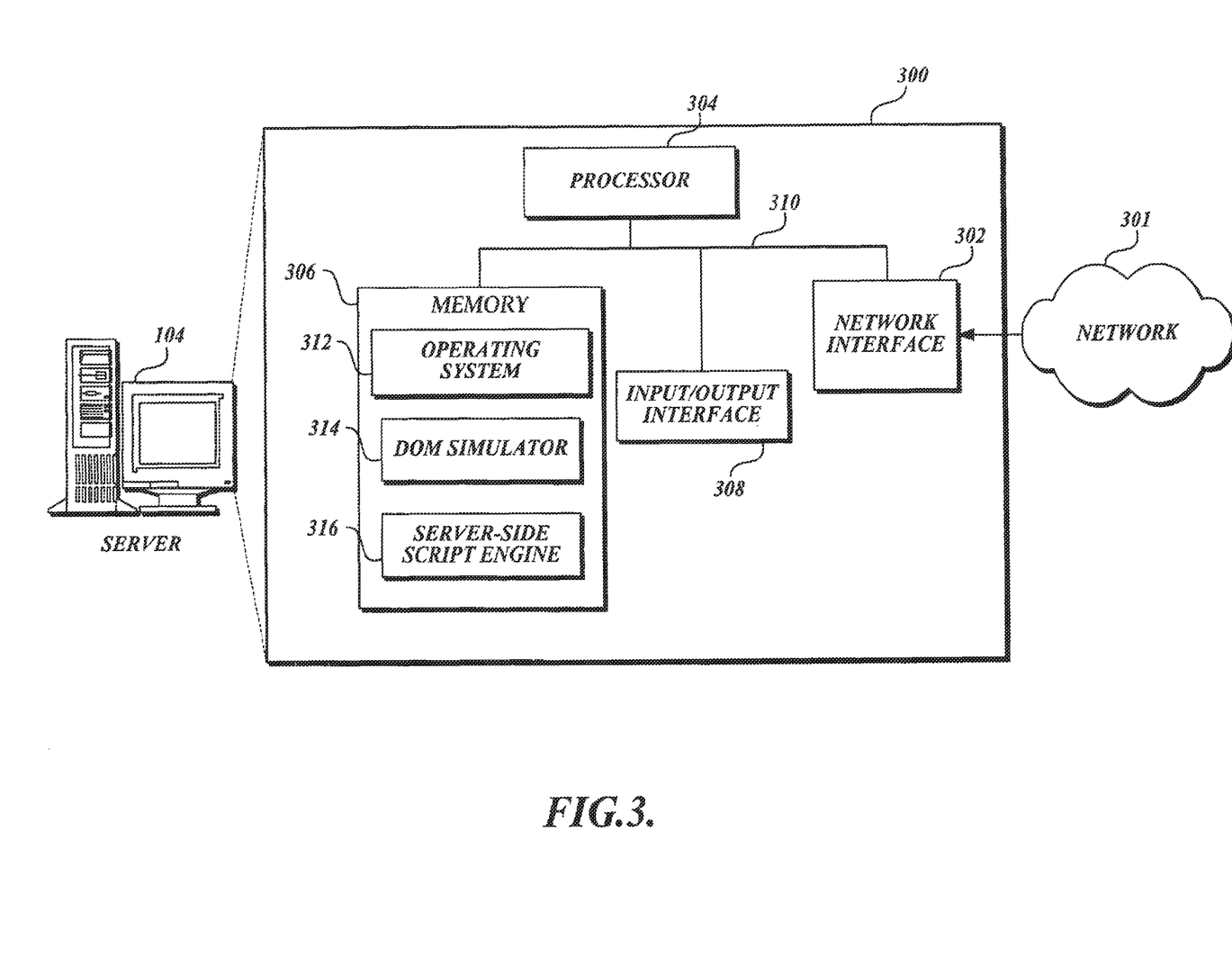
FIG. 3 is a block diagram illustrating an exemplary computer system for server-side rendering of initial content of a Web page.

In embodiments of the invention, the client 102 and the server 104 may locate on the same computer or on different computers in the distributed computing system 100. FIG. 3 depicts an exemplary computer system 300 for the server 104, suitable for use in implementing aspects of the invention. The server 104 connects to a network 301 using a network interface 302. The network interface 302 includes the necessary hardware and software to allow the server 104 to communicate with other computing devices connected to the network 302 by use of one or more suitable communication protocols, such as TCP/IP protocol. For example, if the client 102 exists on another computer system in the distributed computing system 100, the server 104 communicates with the client 102 through the network interface 302.

The server 104 further includes a processor 304, memory 306, and an input/output interface 308, all communicatively connected together and to the network interface 302 by a communication bus 310. The processor 304 is configured to operate in accordance with computer program instructions stored in a memory, such as the memory 306. Program instructions may also be embodied in a hardware format, such as a programmed digital signal processor.

The memory 306 may be comprised of any type of storage facility, and may include, by way of example, RAM, ROM, and/or removable computer-readable media. The memory 306 may store an operating system 312 for controlling the operation of the server 104. The operating system 312 may be a general-purpose operating system such as a MICROSOFT server operating system, UNIX, or LINUX, for example.

As noted above, in exemplary embodiments of the invention, the server 104 builds an environment to simulate and execute a client-side script 108 that generates the initial content of a Web page. The simulation environment may include a DOM simulator to simulate the object model of a file, such as an HTML file, containing the source code of a Web page. The simulation environment may further include a server-side script engine that functions the same as the script engine used by the client 102. Therefore, as shown in FIG. 3, the memory 306 of the server 104 additionally stores program code and data that provide a DOM simulator 314 and a server-side script engine 316. The DOM simulator 314 comprises computer-executable instructions that, when executed by the processor 304, simulates the object models provided by a file such as an HTML that contains the source code of a Web page. The server-side script engine 316 comprises computer-executable instructions that, when executed by the processor 304, simulates or behaves the same as the script engine used by the client 102.

For ease of illustration, FIG. 3 does not show other typical components of a computing system, such as a video display adapter, power supply, computer monitor, etc. However, those skilled in the art of computers will recognize a wide selection of commercially-available components that can be used to construct and operate a computer system such as illustrated in FIG. 3.

Although aspects of the invention have been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The embodiments of the invention in which an exclusive property or privilege is claimed are defined as follows:

1. A method implemented at a Web server computing system that provides one or more Web pages for a client computing system to display and that includes a processor and memory storing instructions which, when executed by the processor, implement the method for enabling the Web server to provide full initial content of a Web page to the client computing system, wherein at least a part of the full initial content of the Web page was designed to be generated at the client computing system by the client executing a client-side script on traditional initial content of the Web page and the client making at least one request for data stored locally on the Web server, the method comprising:

the Web server executing a document object model ("DOM") simulator to generate a DOM of the traditional initial content of the Web page, wherein the DOM models layout and static content of the Web page, and wherein the DOM also models scripts of the Web page;

the Web server extracting, from the DOM, script tags corresponding to the traditional initial content of the Web page, wherein the script tags specify the client-side script that was designed to be executed by the client;

the Web server constructing the client-side script by fetching content identified in the script tags according to a sequential ordering of the content in the script tags;

the Web server executing the client-side script on the DOM to cause the DOM to contain the full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the client-side script were being executed on the client by the client-side script engine, and during execution of the client-side script on the DOM:

the Web server detecting that the client-side script makes a request for data local to the Web server, and using a redirection mechanism to redirect the request as a request for data local to the Web server, instead of sending the request over a network connecting the client and the Web server; and the Web server also identifying and stubbing-out at least one script functionality that is determined to be a client-side functionality that is inapplicable to the Web server when executing the client-side script in the enriched execution environment on the Web server, wherein the at least one script functionality comprises a client-side timer, and wherein stubbing-out the at least one script functionality comprises muffling the client-side timer such that the client-side timer does not raise any event when the client-side script is executed on the Web server;

the Web server extracting a text representation of the full initial content from the DOM; and the Web server sending the text representation of the full initial content of the Web page to the client.

2. The method of claim 1, wherein the full initial content of the Web page sent to the client further includes the layout and static content that has been processed by the client-side script at the Web server.

3. The method of claim 1, wherein the request for data on the Web server comprises a XmlHttpRequest object for retrieving data, and wherein the redirection mechanism implements a different XmlHttpRequest object that directs to request to data local to the Web server, without making a network call.

4. A Web server computer system that provides full initial content of a Web page to a client, wherein the full initial content of the Web page was designed to be generated at the client by the client executing a client-side script on traditional initial content of the Web page and the client making at least one request for data stored locally on the Web server, the Web server computer system comprising:

a processor; and memory storing computer-executable instructions which, when executed by the processor, which is coupled with the memory, implements a method comprising:

the Web server executing a document object model ("DOM") simulator to generate a DOM of the traditional initial content of the Web page, wherein the DOM models layout and static content of the Web page, and wherein the DOM also models scripts of the Web page;

the Web server extracting from the DOM script elements corresponding to the traditional initial content of the Web page, wherein the script elements specify the client-side script that was designed to be executed by the client;

the Web server constructing the client-side script comprising the script elements extracted from the DOM;

the Web server executing the client-side script on the DOM to cause the DOM to contain the full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the client-side script were being executed on the client by the client-side script engine, and during execution of the client-side script on the DOM:

the Web server detecting that the client-side script makes a request for data local to the Web server, and using a redirection mechanism to redirect the request as a request for data local to the Web server, instead of sending the request over a network connecting the client and the Web server; and the Web server also identifying and stubbing-out at least one script functionality that is determined to be a client-side functionality that is inapplicable to the Web server when executing the client-side script in the enriched execution environment on the Web server, wherein the at least one script functionality comprises a client-side timer, and wherein stubbing-out the at least one script functionality comprises muffling the client-side timer such that the client-side timer does not raise any event when the client-side script is executed on the Web server;

the Web server extracting a text representation of the full initial content from the DOM; and the Web server sending the text representation of the full initial content of the Web page to the client.

5. The Web server computer system of claim 4, wherein the full initial content of the Web page sent to the client includes the layout and static content that has been processed by the client-side script at the Web server computer system.

6. A computer-readable storage medium storing computer executable instructions which, when executed by a processor, implement the following method:

executing, at a Web server, a document object model ("DOM") simulator to generate a DOM of a traditional initial content of a Web page, wherein the DOM models layout and static content of the Web page, and wherein the DOM also models scripts of the Web page;

extracting, at the Web server, from the DOM script elements corresponding to the traditional initial content of the Web page, wherein the script elements specify a client-side script that was designed to be executed by a client;

constructing the client-side script comprising the script elements extracted from the DOM;

executing, at the Web server, the client-side script on the DOM to cause the DOM to contain full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the new script were being executed on the client by the client-side script engine, and during execution of the client-side script on the DOM:

the Web server detecting that the client-side script makes a request for data local to the Web server, and using a redirection mechanism to redirect the request as a request for data local to the Web server, instead of sending the request over a network connecting the client and the Web server; and the Web server also identifying and stubbing-out at least one script functionality that is determined to be a client-side functionality that is inapplicable to the Web server when executing the client-side script in the enriched execution environment on the Web server, wherein the at least one script functionality comprises a client-side timer, and wherein stubbing-out the at least one script functionality comprises muffling the client-side timer such that the client-side timer does not raise any event when the client-side script is executed on the Web server;

extracting, at the Web server, a text representation of the full initial content from the DOM; and sending, from the Web server, the text representation of the full initial content of the Web page to the client.

7. The computer-readable storage medium of claim 6, wherein the full initial content of the Web page sent to the client further includes the layout and static content that has been processed by the client side script at the Web server.

8. A method implemented at a Web server computing system that provides one or more Web pages for a client computing system to display and that includes a processor and memory storing instructions which, when executed by the processor, implement the method for enabling the Web server to provide full initial content of a Web page to the client computing system, wherein at least a part of the full initial content of the Web page was designed to be generated at the client computing system by the client executing a client-side script on traditional initial content of the Web page and the client making at least one request for data stored locally on the Web server, the method comprising:

the Web server executing a document object model ("DOM") simulator to generate a DOM of the traditional initial content of the Web page, wherein the DOM models layout and static content of the Web page, and wherein the DOM also models scripts of the Web page;

the Web server extracting, from the DOM, script tags corresponding to the traditional initial content of the Web page, wherein the script tags specify the client-side script that was designed to be executed by the client;

the Web server constructing the client-side script by fetching content identified in the script tags according to a sequential ordering of the content in the script tags;

the Web server executing the client-side script on the DOM to cause the DOM to contain the full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the client-side script were being executed on the client by the client-side script engine, and during execution of the client-side script on the DOM:
the Web server detecting that the client-side script makes a request for data local to the Web server, and using a redirection mechanism to redirect the request as a request for data local to the Web server, instead of sending the request over a network connecting the client and the Web server, wherein the request for data on the Web server comprises a XmlHttpRequest object for retrieving data, and wherein the redirection mechanism implements a different XmlHttpRequest object that directs to request to data local to the Web server, without making a network call; and
the Web server also identifying and stubbing-out at least one script functionality that is determined to be a client-side functionality that is inapplicable to the Web server when executing the client-side script in the enriched execution environment on the Web server;
the Web server extracting a text representation of the full initial content from the DOM; and
the Web server sending the text representation of the full initial content of the Web page to the client.

9. A Web server computer system that provides full initial content of a Web page to a client, wherein the full initial content of the Web page was designed to be generated at the client by the client executing a client-side script on traditional initial content of the Web page and the client making at least one request for data stored locally on the Web server, the Web server computer system comprising:
a processor; and
memory storing computer-executable instructions which, when executed by the processor, which is coupled with the memory, implements a method comprising:
the Web server executing a document object model ("DOM") simulator to generate a DOM of the traditional initial content of the Web page, wherein the DOM models layout and static content of the Web page, and wherein the DOM also models scripts of the Web page;
the Web server extracting from the DOM script elements corresponding to the traditional initial content of the Web page, wherein the script elements specify the client-side script that was designed to be executed by the client;
the Web server constructing the client-side script comprising the script elements extracted from the DOM;
the Web server executing the client-side script on the DOM to cause the DOM to contain the full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the client-side script were being executed on the client by the client-side script engine, and during execution of the client-side script on the DOM:
the Web server detecting that the client-side script makes a request for data local to the Web server, and using a redirection mechanism to redirect the request as a request for data local to the Web server, instead of sending the request over a network connecting the client and the Web server, wherein the request for data on the Web server comprises a XmlHttpRequest object for retrieving data, and wherein the redirection mechanism implements a different XmlHttpRequest object that directs to request to data local to the Web server, without making a network call; and
the Web server also identifying and stubbing-out at least one script functionality that is determined to be a client-side functionality that is inapplicable to the Web server when executing the client-side script in the enriched execution environment on the Web server, wherein the at least one script functionality comprises a client-side timer, and wherein stubbing-out the at least one script functionality comprises muffling the client-side timer such that the client-side timer does not raise any event when the client-side script is executed on the Web server;
the Web server extracting a text representation of the full initial content from the DOM; and
the Web server sending the text representation of the full initial content of the Web page to the client.

10. A computer-readable storage medium storing computer executable instructions which, when executed by a processor, implement the following method:
executing, at a Web server, a document object model ("DOM") simulator to generate a DOM of a traditional initial content of a Web page, wherein the DOM models layout and static content of the Web page, and wherein the DOM also models scripts of the Web page;
extracting, at the Web server, from the DOM script elements corresponding to the traditional initial content of the Web page, wherein the script elements specify a client-side script that was designed to be executed by a client;
constructing the client-side script comprising the script elements extracted from the DOM;
executing, at the Web server, the client-side script on the DOM to cause the DOM to contain full initial content of the Web page, wherein the client-side script is executed using a server-side script engine that simulates a client-side script engine that would be used on the client, wherein the server-side script engine simulates an enriched execution environment in which the DOM is available to the client-side script as a built-in object, accessible through the same paths as if the DOM were on the client such that the DOM appears to the client-side script as if the new script were being executed on the client by the client-side script engine, and during execution of the client-side script on the DOM:
the Web server detecting that the client-side script makes a request for data local to the Web server, and using a redirection mechanism to redirect the request as a request for data local to the Web server, instead of sending the request over a network connecting the client and the Web server, wherein the request for data on the Web server comprises a XmlHttpRequest object for retrieving data, and wherein the redirection mechanism implements a different XmlHttpRequest object that directs to request to data local to the Web server, without making a network call; and
the Web server also identifying and stubbing-out at least one script functionality that is determined to be a client-side functionality that is inapplicable to the Web server when executing the client-side script in the enriched execution environment on the Web server, wherein the at least one script functionality comprises a client-side timer, and wherein stubbing-out the at least one script functionality comprises muffling the client-side timer such that the client-side timer does not raise any event when the client-side script is executed on the Web server;

extracting, at the Web server, a text representation of the full initial content from the DOM; and sending, from the Web server, the text representation of the full initial content of the Web page to the client.

* * * * *

UNITED STATES PATENT AND TRADEMARK OFFICE
CERTIFICATE OF CORRECTION

| | | |
|---|---|---|
| PATENT NO. | : 7,814,410 B2 | Page 1 of 1 |
| APPLICATION NO. | : 11/317973 | |
| DATED | : October 12, 2010 | |
| INVENTOR(S) | : Kothari et al. | |

It is certified that error appears in the above-identified patent and that said Letters Patent is hereby corrected as shown below:

Title Page
Item [73]: Assignee:, change "Workman Nydegger" to --Microsoft Corporation--

Signed and Sealed this
Twelfth Day of April, 2011

David J. Kappos
*Director of the United States Patent and Trademark Office*